(12) United States Patent
Watanabe

(10) Patent No.: US 11,006,031 B2
(45) Date of Patent: May 11, 2021

(54) ACCESSORY DEVICE, CAMERA, STORAGE MEDIUM, AND CAMERA SYSTEM IN WHICH COMMUNICATION IS PERFORMED VIA DATA AND NOTIFICATION CHANNELS AND EMPLOYS DIFFERENCES IN VOLTAGE LEVEL FOR THE NOTIFICATION CHANNEL DURING A PERIOD IN WHICH DATA IS RECEIVED

(71) Applicant: CANON KABUSHIKI KAISHA, Tokyo (JP)

(72) Inventor: Yutaka Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/694,326

(22) Filed: Nov. 25, 2019

(65) Prior Publication Data

US 2020/0092461 A1    Mar. 19, 2020

Related U.S. Application Data

(63) Continuation of application No. PCT/JP2018/020769, filed on May 30, 2018.

(30) Foreign Application Priority Data

May 31, 2017  (JP) .............................. JP2017-108267
May 30, 2018  (JP) .............................. JP2018-102943

(51) Int. Cl.
*H04N 5/228* (2006.01)
*H04N 5/232* (2006.01)
(Continued)

(52) U.S. Cl.
CPC .......... *H04N 5/23209* (2013.01); *G03B 17/14* (2013.01); *G03B 17/565* (2013.01); *H04N 5/2254* (2013.01)

(58) Field of Classification Search
CPC ......................... G03B 17/565; H04N 5/23209
See application file for complete search history.

(56) References Cited

U.S. PATENT DOCUMENTS 4,572,638 A    2/1986  Nakai
5,257,058 A    10/1993 Mabuchi
(Continued)

FOREIGN PATENT DOCUMENTS

CN    101674405 A    3/2010
CN    102890393 A    1/2013
(Continued)

*Primary Examiner* — Gary C Vieaux
(74) *Attorney, Agent, or Firm* — Canon U.S.A., Inc. IP Division

(57) ABSTRACT

A camera 200 and accessory devices 100 and 300 perform communication via channels including a data communication channel used for data communication and a notification channel for notifying timing of communication performed via the data communication channel. Each of the accessory devices 100 and 300 performs switching from a first communication mode to a second communication mode upon receiving communication-partner designation data via the data communication channel with communication in the first communication mode, the communication-partner designation data indicating that the relevant accessory device has been selected as a communication partner with the camera 200.

21 Claims, 10 Drawing Sheets

(51) Int. Cl.
  *G03B 17/14* (2021.01)
  *G03B 17/56* (2021.01)
  *H04N 5/225* (2006.01)

(56) References Cited

U.S. PATENT DOCUMENTS

| | | |
|---|---|---|
| 6,707,992 B2 | 3/2004 | Uenaka et al. |
| 7,522,828 B2 | 4/2009 | Doi et al. |
| 8,414,205 B2 | 4/2013 | Okada |
| 8,755,684 B2 | 6/2014 | Sugiyama et al. |
| 8,757,904 B2 | 6/2014 | Hasuda |
| 8,814,449 B2 | 8/2014 | Hasuda et al. |
| 9,042,715 B2 | 5/2015 | Kawanami |
| 10,079,968 B2 | 9/2018 | Galor et al. |
| 10,511,770 B2 | 12/2019 | Watanabe |
| 10,841,477 B2 * | 11/2020 | Yonezawa ............... G03B 17/14 |
| 2005/0057683 A1 | 3/2005 | Terane |
| 2011/0229114 A1 | 9/2011 | Okada |
| 2011/0229115 A1 | 9/2011 | Okada |
| 2012/0033955 A1 | 2/2012 | Okada |
| 2013/0028590 A1 | 1/2013 | Hasuda et al. |
| 2013/0077952 A1 | 3/2013 | Sugiyama et al. |
| 2013/0077954 A1 | 3/2013 | Oikawa et al. |
| 2015/0116592 A1 | 4/2015 | Suzuki |
| 2016/0105613 A1 | 4/2016 | Takanashi |
| 2016/0119538 A1 | 4/2016 | Kim |
| 2017/0052797 A1 | 2/2017 | Shu |
| 2018/0224720 A1 | 8/2018 | Pan |
| 2020/0081323 A1 * | 3/2020 | Watanabe ............... G03B 17/56 |

FOREIGN PATENT DOCUMENTS

| | | |
|---|---|---|
| CN | 102970465 A | 3/2013 |
| CN | 103019008 A | 4/2013 |
| CN | 103069335 A | 4/2013 |
| CN | 103988123 A | 8/2014 |
| CN | 106469128 A | 3/2017 |
| EP | 0443463 A1 | 8/1991 |
| JP | 11-344764 A | 12/1999 |
| JP | 2007-148592 A | 6/2007 |
| JP | 2008256847 A | 10/2008 |
| JP | 2009-186545 A | 8/2009 |
| JP | 2012-37692 A | 2/2012 |
| JP | 2013-178326 A | 9/2013 |
| JP | 2014-71289 A | 4/2014 |
| JP | 2016-61800 A | 4/2016 |
| JP | 2016-167719 A | 9/2016 |
| JP | 2017-41833 A | 2/2017 |
| WO | 03028366 A1 | 4/2003 |
| WO | 03060607 A1 | 7/2003 |
| WO | 03071788 A1 | 8/2003 |
| WO | 2013/168742 A1 | 11/2013 |
| WO | 2017/068912 A1 | 4/2017 |

* cited by examiner

ACCESSORY DEVICE, CAMERA, STORAGE MEDIUM, AND CAMERA SYSTEM IN WHICH COMMUNICATION IS PERFORMED VIA DATA AND NOTIFICATION CHANNELS AND EMPLOYS DIFFERENCES IN VOLTAGE LEVEL FOR THE NOTIFICATION CHANNEL DURING A PERIOD IN WHICH DATA IS RECEIVED

CROSS-REFERENCE TO RELATED APPLICATIONS

This application is a Continuation of international Patent Application No. PCT/JP2018/020769, filed May 30, 2018, which claims the benefit of Japanese Patent Application No. 2017-108267 filed May 31, 2017 and No. 2018-102943 filed May 30, 2018, both of which are hereby incorporated by reference herein in their entirety.

TECHNICAL FIELD

The present invention relates to an accessory device, a camera, a storage medium, and a camera system.

BACKGROUND ART

As an example of interchangeable-lens camera systems, there is known a system in which a camera performs an image pickup process and lens control, and in which an interchangeable lens serving as a first accessory device performs lens driving in accordance with a control command from a camera main unit. In such a camera system, transfer of the control command from the camera main unit to the interchangeable lens and transfer of lens information from the interchangeable lens to the camera main unit are made via a communication channel for mutual exchange of information.

There is also known a camera system in which an intermediate adapter serving as a second accessory device, e.g., a converter for changing the focal length of the interchangeable lens, can be connected between the camera main unit and the interchangeable lens in order to extend the photographing function. In such a camera system, communication between the camera main unit and the intermediate adapter is often needed in addition to communication between the camera main unit and the interchangeable lens. In that case, the camera main unit designates a communication partner from a plurality of accessory devices and performs communication with the designated communication partner.

Patent Literature (PTL) 1 discloses a communication control method in accordance with the I2C (Inter-Integrated Circuit) communication protocol. In I2C communication, a plurality of communication slaves is connected to a communication master, and communication is performed between the communication master and the communication slave designated by the communication master.

In the I2C communication, the communication master transmits address information designating the particular slave to all the communication slaves. Each of the communication slaves holds specific address information assigned to itself, and the communication slave holding the specific address information corresponding to the address information transmitted from the communication master becomes the communication partner with the communication master.

CITATION LIST

Patent Literature

PTL 1 Japanese Patent Laid-Open No. 2007-148592

In the communication system according to the I2C communication protocol disclosed in PTL1, the address information designating the communication slave needs to be transmitted and received each time communication is performed between the communication master and the communication slave. Furthermore, the communication slave is required to check, based on the address information, whether it is selected as the communication partner with the communication master.

In the above-described communication method, the address information needs to be included in a data format, and an amount of transmittable data is reduced corresponding to data of the address information. Moreover, because the communication slave checks for each communication whether it is selected as the communication partner, there is a possibility that a wait time may generate until the start of communication. Thus, the communication method disclosed in PTL 1 accompanies with a possibility that a data communication speed between the communication master and the communication slave cannot be sufficiently increased.

An object of the present invention is to realize an accessory device and a camera which can perform communication between the camera and the accessory device at a high speed.

SUMMARY OF INVENTION

The present invention provides an accessory device mountable to a camera, the accessory device including an accessory control unit controlling communication that is performed between the camera and the accessory device via channels, the channels including a data communication channel used for data communication and a notification channel for notifying timing of communication performed via the data communication channel, wherein the accessory control unit is able to switch a first communication mode used for communication between the camera and a plurality of accessory devices, which are mounted to the camera and include the aforesaid accessory device, and a second communication mode that is used to individually communicate with the camera and that is different from the first communication mode in voltage level of the notification channel during a period in which data is received from the camera, and wherein the accessory control unit performs switching from the first communication mode to the second communication mode upon receiving communication-partner designation data via the data communication channel in the first communication mode, the communication-partner designation data indicating that the aforesaid accessory device has been selected as a communication partner with the camera in the second communication mode.

The present invention further provides a camera to which a first accessory device and a second accessory device are mountable, the camera including a camera control unit controlling communication that is performed via channels including a data communication channel used for data communication with the first accessory device and the second accessory device, and a notification channel for notifying timing of communication performed via the data communication channel, wherein the camera control unit is able to switch a first communication mode used for communication with the first accessory device and the second accessory device and a second communication mode that is used to individually communicate with one of the first accessory device and the second accessory device and that is different from the first communication mode in voltage level of the notification channel during a period in which data is transmitted from the camera, and wherein the camera control unit performs switching from the first communication mode to the second communication mode upon transmitting communication-partner designation data to the first accessory device and the second accessory device via the data communication channel in the first communication mode, the communication-partner designation data indicating a communication partner with the camera in the second communication mode.

Further features of the present invention will become apparent from the following description of exemplary embodiments with reference to the attached drawings.

DESCRIPTION OF EMBODIMENTS

A communication control method in an accessory device, including an interchangeable lens and an intermediate adapter, and a camera according to the present invention will be described in detail below with reference to the accompanying drawings. Between the accessory device and the camera, communication is performed in accordance with a plurality of communication modes. The term "communication mode" implies a broadcast communication mode and a P2P communication mode. In the following description, the broadcast communication mode is called a first communication mode and the P2P communication mode is called a second communication mode in some cases.

Figure 1:
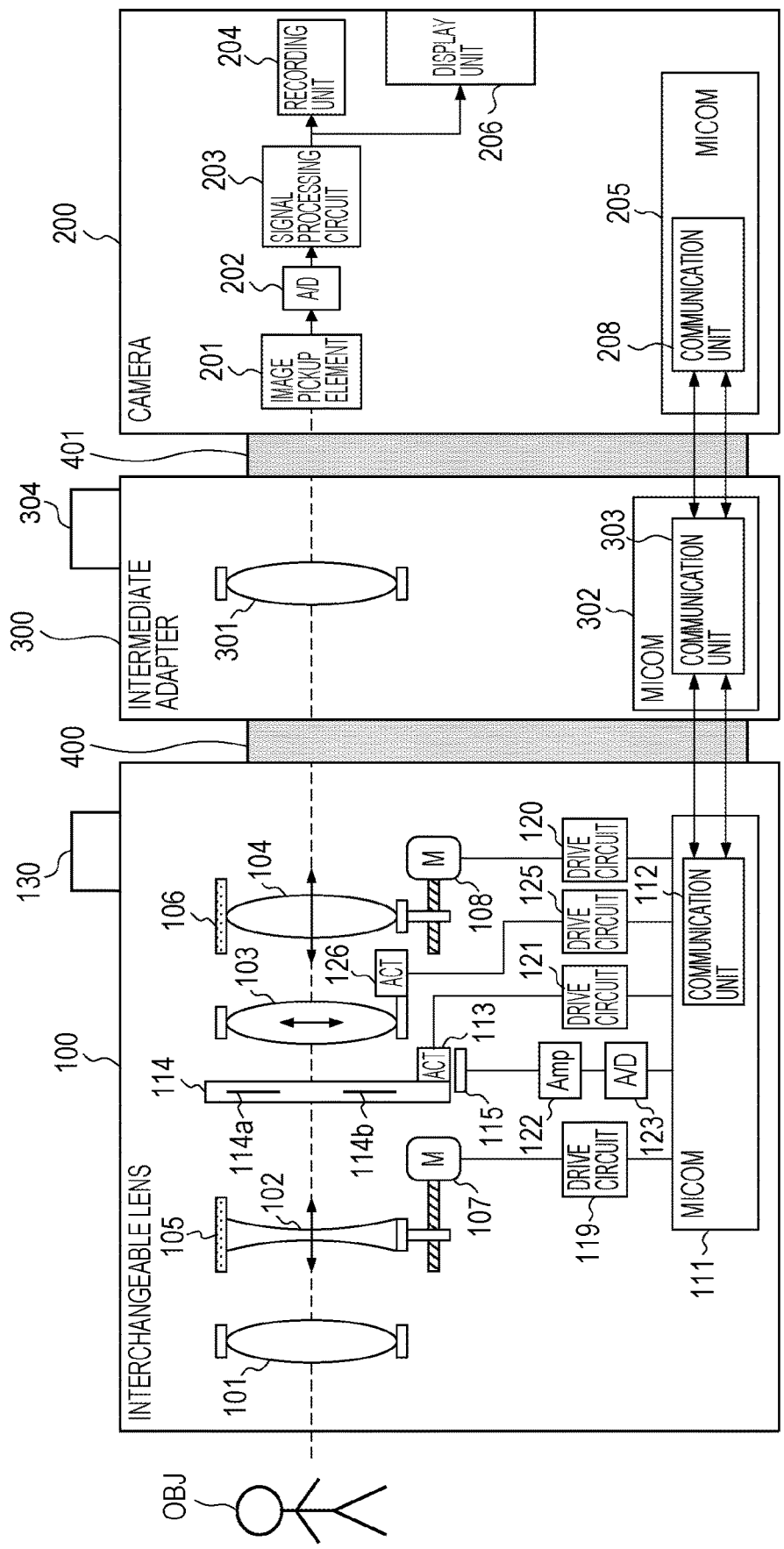
FIG. 1 is a block diagram illustrating a configuration of a camera system that includes a camera and an accessory device.

The present invention relates to a camera system in which a communication mode between a camera main unit and the accessory device is changed as the occasion requires. The present invention can be applied to a camera system in which an intermediate adapter 300 is mounted between a camera 200 and an interchangeable lens 100 as illustrated in FIG. 1. Although the following embodiment is described in connection with an example in which one intermediate adapter 300 is mounted between the camera 200 and the interchangeable lens 100, a plurality of intermediate adapters may be mounted between the camera 200 and the interchangeable lens 100.

According to the present invention, in the broadcast communication, data transmission is performed from the camera 200 operating as a communication master to individual accessory devices each operating as a communication slave at once. When the camera 200 performs the P2P communication that is one-to-one communication with a particular accessory device, information indicating a communication partner with the camera 200 in the P2P communication is notified to each accessory device in the broadcast communication.

Because the communication partner with the camera 200 is already notified to each accessory device at the timing of the start of the P2P communication, the camera 200 is not required to transmit, to each accessory device, the information for specifying the communication partner in the P2P communication. Thus, a communication speed in the P2P communication can be increased by, after selecting the communication partner with the camera 200 in the broadcast communication, making switching to the P2P communication that is the one-to-one communication method between the camera 200 and the selected communication partner.

Explanation of Configuration of Camera System

FIG. 1 illustrates a configuration of a camera system including the camera 200 according to the present invention, the intermediate adapter 300, and the interchangeable lens 100, the latter two being the accessory devices mountable to the camera 200. Not only the case in which the accessory device is directly connected to the camera 200, but also the case in which the accessory device is connected to the camera 200 with the intermediate adaptor 300 interposed therebetween is described as representing a state in which the accessory device is mounted to the camera 200.

The camera 200, the interchangeable lens 100, and the intermediate adapter 300 transfer control commands and internal information through individual communication units equipped therein. Each of the communication units is adaptable for the broadcast communication and the P2P communication and performs communication in accordance with the communication mode that is determined by the camera 200.

First, detailed configurations of the interchangeable lens 100, the intermediate adapter 300, and the camera 200 are described. The intermediate adapter 300 and the camera 200 are mechanically and electrically connected through a mount 401 that is a coupling mechanism. The intermediate adapter 300 is supplied with electric power from the camera 200 through a not-illustrated power supply terminal, which is provided in the mount 401, to operate an adapter microcomputer (hereinafter called an adapter MICOM) 302.

The interchangeable lens 100 and the intermediate adapter 300 are mechanically and electrically connected through a mount 400 that is a coupling mechanism. The interchangeable lens 100 is supplied with electric power from the camera 200 through a not-illustrated power supply terminal provided in the mount 400 and the not-illustrated power supply terminal provided in the mount 401. By using the electric power received from the camera 200, the interchangeable lens 100 operates later-described various actuators and a lens microcomputer (hereinafter called a lens MICOM) 111. Moreover, the interchangeable lens 100, the intermediate adapter 300, and the camera 200 perform mutual communication through communication terminals (illustrated in FIG. 2) provided in the mounts 400 and 401.

Next, the configuration of the interchangeable lens 100 is described. The interchangeable lens 100 includes an image pickup optical system. The image pickup optical system includes a field lens 101, a zoom lens 102 for zooming, a diaphragm unit 114 for adjusting a light quantity, an image stabilizing lens 103, and a focus lens 104 for focus adjustment, which are successively disposed in the mentioned order from the side close to an object OBJ.

The zoom lens 102 and the focus lens 104 are held by lens holding frames 105 and 106, respectively. The lens holding frames 105 and 106 are movably guided by not-illustrated guide shafts in the direction of an optical axis denoted by a dotted line in the drawing, and are driven in the direction of the optical axis by stepping motors 107 and 108, respectively. The stepping motors 107 and 108 move respectively the zoom lens 102 and the focus lens 104 in synchronism with drive pulses.

The image stabilizing lens 103 is movable in a direction perpendicular to the optical axis of the image pickup optical system to reduce an image blur attributable to a hand shake, etc.

The lens MICOM 111 is an accessory control unit for controlling operations of various components in the interchangeable lens 100. The lens MICOM 111 receives a control command, which is transmitted from the camera 200, through a lens communication unit 112, i.e., an accessory communication unit, and accepts a request for transmitting lens data. Moreover, the lens MICOM 111 performs lens control corresponding to the control command and transmits lens data, which corresponds to the transmission request, to the camera 200 through the lens communication unit 112.

In addition, the lens MICOM 111 outputs drive signals to a zoom drive circuit 119 and a focus drive circuit 120 in response to those ones among control commands, which are related to zooming and focusing, thereby driving the stepping motors 107 and 108. As a result, zoom process of controlling a zoom operation by the zoom lens 102 and an auto-focus process of controlling a focus adjustment operation by the focus lens 104 are performed.

The diaphragm unit 114 includes diaphragm blades 114a and 114b. States of the diaphragm blades 114a and 114b are detected by a Hall element 115, and a detected signal is input to the lens MICOM 111 through an amplifier circuit 122 and an A/D converter circuit 123. The lens MICOM 111 outputs a drive signal to a diaphragm drive circuit 121 in accordance with an input signal from the A/D converter circuit 123, thereby driving a diaphragm actuator 113. As a result, a light quantity adjustment operation by the diaphragm unit 114 is controlled.

Moreover, the lens MICOM 111 drives an image stabilizing actuator 126 through an image stabilizing drive circuit 125 depending on a shake detected by a not-illustrated shake sensor, such as a vibration gyro, which is disposed in the interchangeable lens 100. As a result, an image stabilizing process of controlling a shift operation of the image stabilizing lens 103 is performed.

The configuration of the intermediate adapter 300 is now described. In this embodiment, the intermediate adapter 300 is an extender for extending the focal length of the interchangeable lens 100. The intermediate adapter 300 is not limited to the extender and may be given with various functions. For example, a filter for changing transmittance of light having passed through the interchangeable lens 100 may be incorporated in the intermediate adapter 300. The intermediate adapter 300 may include a plurality of filters having different optical transmittances and may be able to select appropriate one of the filters depending on photographing situations, etc.

The intermediate adapter 300 in this embodiment includes a zoom lens 301 for extending the focal length of the interchangeable lens 100, and the adapter MICOM 302, i.e., an accessory control unit, for controlling operations of various components in the intermediate adapter 300. The adapter MICOM 302 receives a control command, which is transmitted from the camera 200, through an adapter communication unit 303, i.e., an accessory communication unit, and performs adapter control corresponding to the control command. Moreover, the adapter MICOM 302 transmits adapter data, which corresponds to a transmission request from the camera 200, to the camera 200 through the adapter communication unit 303.

Next, the configuration of the camera 200 is described. The camera 200 includes an image pickup element 201 such as a CCD sensor or a CMOS sensor, an A/D converter circuit 202, a signal processing circuit 203, a recording unit 204, a camera microcomputer (hereinafter called a camera MICOM) 205, and a display unit 206.

The image pickup element 201 photo-electrically converts an object image that has been formed by the image pickup optical system in the interchangeable lens 100, and outputs an electrical signal (analog signal). The A/D converter circuit 202 converts the analog signal from the image pickup element 201 to a digital signal. The signal processing circuit 203 performs various types of image processing on the digital signal from the A/D converter circuit 202 and produces a video signal.

Furthermore, the signal processing circuit 203 produces, from the video signal, focus information indicating a contrast state of the object image, i.e., a focus state of the image pickup optical system, and luminance information indicating an exposure state. The signal processing circuit 203 outputs the video signal to the display unit 206, and the display unit 206 displays the video signal as a live view image that is used to check a composition, a focus state, etc.

The camera MICOM 205 serving as a camera control unit controls the camera 200 in response to inputs from camera operating members, such as an image-pickup instruction switch and various setting switches (not illustrated). Furthermore, the camera MICOM 205 transmits a control command, which is related to the zoom operation of the zoom lens 102, to the lens MICOM 111 through a camera communication unit 208 in response to an operation of a not-illustrated zoom switch. In addition, the camera MICOM 205 transmits control commands for the light quantity adjustment operation of the diaphragm unit 114 depending on the luminance information and the focus adjustment operation of the focus lens 104 depending on the focus information to the lens MICOM 111 through the camera communication unit 208.

The camera MICOM 205 transmits data to the intermediate adapter 300 and the interchangeable lens 100 at once in the broadcast communication and performs one-to-one data communication with one of the intermediate adapter 300 and the interchangeable lens 100 in the P2P communication.

Explanation of Configuration of Communication Circuits

Figure 2:
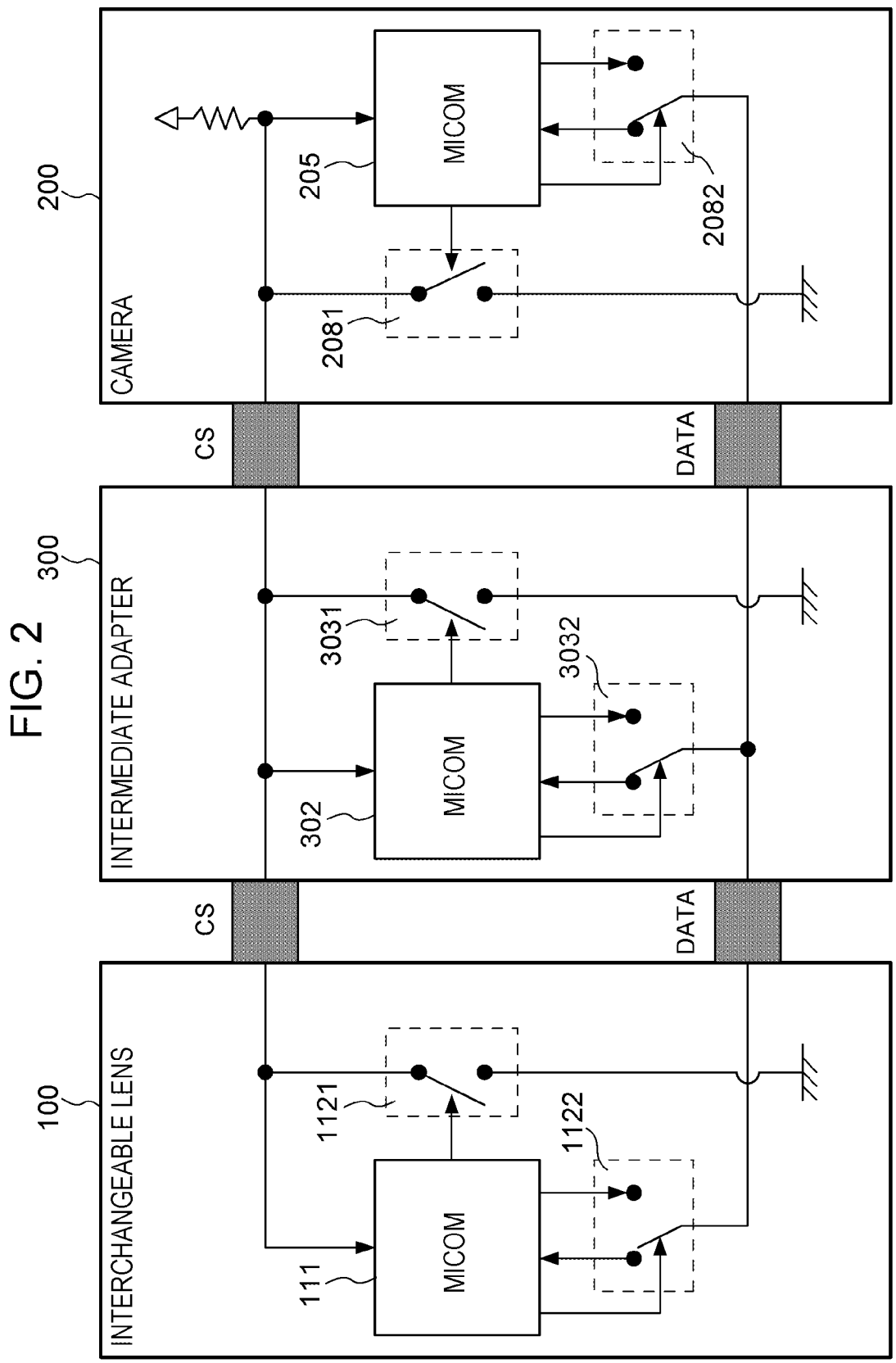
FIG. 2 is a schematic view illustrating communication circuits in the camera system.

Communication circuits constituted in the camera system including the camera 200, the intermediate adapter 300, and the interchangeable lens 100 will be described below with reference to FIG. 2. The camera system in this embodiment includes a notification channel CS used for notification of communication timing, and a data communication channel DATA used for data communication.

As described with reference to FIG. 1, the camera 200 and the intermediate adapter 300 are connected through the mount 401. The mount 401 includes at least two communication terminals. The intermediate adapter 300 and the interchangeable lens 100 are connected through the mount 400. The mount 400 includes at least two communication terminals. The above-mentioned notification channel CS and data communication channel DATA are formed by the communication terminals provided in the mounts.

The notification channel CS is connected to the camera MICOM 205, the adapter MICOM 302, and the lens MICOM 111. Each MICOM can detect a signal level (voltage level) of the notification channel CS. Furthermore, the notification channel CS is pull-up connected to a not-illustrated power supply disposed in the camera 200. The notification channel CS is connectable to a ground through a ground switch 2081 included in the camera 200, and is further connectable to the ground through a ground switch 3031 included in the intermediate adapter 300. In addition, the notification channel CS is connectable to the ground through a ground switch 1121 included in the interchangeable lens 100.

With the above-described circuit configuration, the signal level of the notification channel CS can be set to Low (first level) by bringing any one of the ground switches included in the camera 200, the intermediate adapter 300, and the interchangeable lens 100 into a connected state (first setting). The signal level of the notification channel CS can be set to High (second level) by bringing all of the ground switches included in the camera 200, the intermediate adapter 300, and the interchangeable lens 100 into a cutoff state (second setting).

Each MICOM can change the connected state between the notification channel CS and the ground by changing the connected state of the ground switch. In other words, each MICOM can set the signal level of the notification channel CS to High or Low by changing the connected state of the ground switch.

For example, the camera MICOM 205 can set the signal level of the notification channel CS to Low by bringing the ground switch 2081 included in the camera main unit 200 into the connected state. In the present invention, bringing the ground switch into the connected state is expressed by the wording "outputting Low to the notification channel CS". Furthermore, bringing the ground switch into the cutoff state is expressed by the wording "outputting High to the notification channel CS".

Thus, the signal level of the notification channel CS is set to High when all the MICOMs output High to the notification channel CS. On the other hand, the signal level of the notification channel CS is set to Low when any one MICOM outputs Low to the notification channel CS. The role of the notification channel CS in data communication will be described later.

The data communication channel DATA is a two-way data communication channel capable of changing a data propagation direction. The data notification channel DATA is connected to the camera MICOM 205, the adapter MICOM 302, and the lens MICOM 111.

The data communication channel DATA is connected to the camera MICOM 205 through an input/output changeover switch 2082 included in the camera 200. The camera MICOM 205 includes a data output unit for transmitting data and a data input unit for receiving data. In accordance with an operation of the input/output changeover switch 2082, the camera MICOM 205 can selectively connect the data communication channel DATA to one of the data output unit and the data input unit.

Furthermore, the data communication channel DATA is connected to the adapter MICOM 302 through an input/output changeover switch 3032 included in the intermediate adapter 300. The adapter MICOM 302 includes a data output unit for transmitting data and a data input unit for receiving data. In accordance with an operation of the input/output changeover switch 3032, the adapter MICOM 302 can selectively connect the data communication channel DATA to one of the data output unit and the data input unit.

The data communication channel DATA is connected to the lens MICOM 111 through an input/output changeover switch 1122 included in the interchangeable lens 100. The lens MICOM 111 includes a data output unit for transmitting data and a data input unit for receiving data. In accordance with an operation of the input/output changeover switch 1122, the lens MICOM 111 can selectively connect the data communication channel DATA to one of the data output unit and the data input unit. With the above-described circuit configuration, the data propagation direction in the data communication channel DATA can be appropriately switched.

Explanation of Data Format

A format of data communicated via the data communication channel DATA will be described below with reference to FIG. 3.

Figure 3:
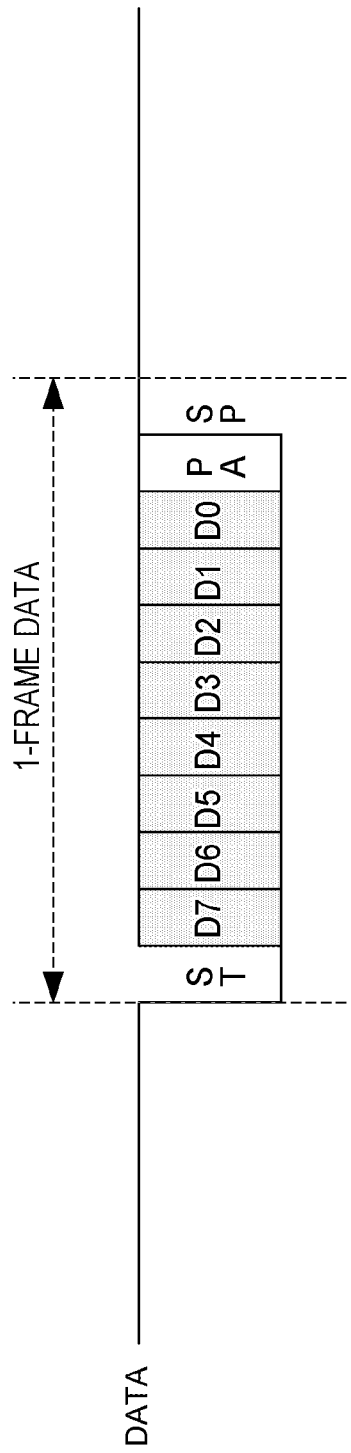
FIG. 3 illustrates a format for data transmitted and received.

FIG. 3 illustrates a data format in a start-stop synchronization communication method of previously setting a communication speed on both the data transmitting side and the data receiving side, and performing data communication at a communication bit rate in accordance with the setting. The term "communication bit rate" implies an amount of data capable of being transferred per second, and it is expressed in bps (bit per second). FIG. 3 illustrates a signal waveform of one frame that is a minimum communication unit.

In a state in which the data communication is not performed, a signal level of the data communication channel DATA is maintained at a High level. Then, the signal level of the data communication channel DATA is set to Low for a I-bit period in order to notify the start of the data transmission to the data receiving side. This 1-bit period is called a start bit ST, and a data frame begins with the start bit ST. Data of 1 byte is transmitted for an 8-bit period spanning from the second bit, which succeeds to the start bit ST, to the ninth bit.

A data bit array is in MSB (Most Significant Bit) first format that begins with the most significant data D7, followed by data D6, data D5, etc. in order, and that ends with the least significant data D0. Parity information (PA) of 1 bit is added at the tenth bit, and the signal level of the data communication channel DATA is set to High for a period of a stop bit SP that indicates the end of one frame. A data frame period beginning with the start bit ST is thereby ended. The parity information is not always required to be one bit, and parity information of multiple bits may be added. The parity information is not essential, and a format added with no parity information may also be used.

Alternatively, the data bit array may be in LSB (Least Significant Bit) first format that begins with the least significant data D0, followed by data D1, data D2, etc. in order, and that ends with the most significant data D7. Although 1-byte data is transmitted for the 8-bit period in this embodiment, the 1-byte data may be transmitted for a bit period other than the 8-bit period.

Explanation of Broadcast Communication

The broadcast communication will be described below with reference to FIG. 4. The broadcast communication is performed under conditions that the camera 200 operates as a communication master and each of the intermediate adapter 300 and the interchangeable lens 100 operates as a communication slave.

Figure 4:
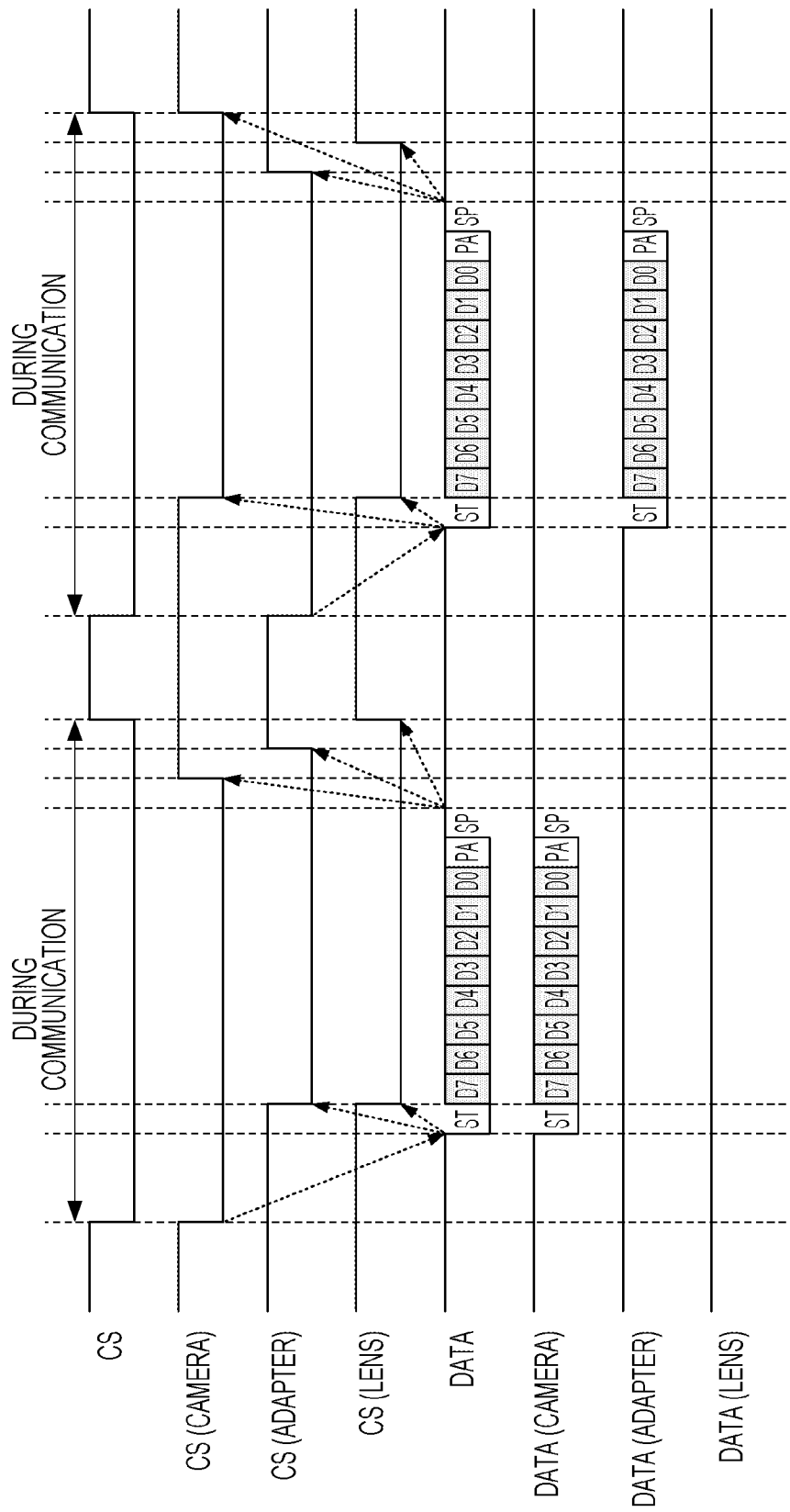
FIG. 4 is a schematic view illustrating communication waves in broadcast communication.

FIG. 4 illustrates signal waves transferred in the broadcast communication. The camera MICOM 205 of the camera 200, i.e., the communication master, notifies the start of the broadcast communication to the lens MICOM 111 and the adapter MICOM 302, i.e., the communication slaves, by outputting Low to the notification channel CS.

Then, the camera MICOM 205 transmits data to the lens MICOM 111 and the adapter MICOM 302 via the data communication channel DATA.

On the other hand, the lens MICOM 111 and the adapter MICOM 302 output Low to the notification channel CS in response to detection of the above-described start bit ST via the data communication channel DATA. Because the camera MICOM 205 already outputs Low at the time when the lens MICOM 111 and the adapter MICOM 302 output Low to the notification channel CS, the signal level of the notification channel CS is continuously kept Low.

The lens MICOM 111 and the adapter MICOM 302 notify a communication wait request by outputting Low to the notification channel CS. The communication wait request is to temporarily stop the communication in the camera system, and the presence of the communication wait request is determined based on the signal level of the notification channel CS.

After transmitting all data, the camera MICOM 205 outputs High to the notification channel CS. After receiving the stop bit SP transmitted via the data communication channel DATA, the lens MICOM 111 and the adapter MICOM 302 execute analysis of the received data and internal processing corresponding to the received data. Then, the lens MICOM 111 and the adapter MICOM 302 output High to the notification channel CS after the preparations for executing the next communication have finished.

When all components constituting the camera system output High to the notification channel CS, the signal level of the notification channel CS becomes High. The camera MICOM 205, the lens MICOM 111, and the adapter MICOM 302 can confirm, based on return of the signal level of the notification channel CS to High, the fact that the components constituting the camera system have come into a state capable of executing the next communication.

In FIG. 4, the data transmitted from the camera MICOM 205 includes a transmission request command to the adapter MICOM 302, and data transmission by the adapter MICOM 302 is performed following the data transmission by the camera MICOM 205.

More specifically, after the signal level of the notification channel CS has become High, the adapter MICOM 302 outputs Low to the notification channel CS. Thus, the adapter MICOM 302 notifies the start of the broadcast communication to the lens MICOM 111 and the camera MICOM 205. Then, the adapter MICOM 302 transmits data to the lens MICOM 111 and the camera MICOM 205 via the data communication channel DATA.

On the other hand, the lens MICOM 111 and the camera MICOM 205 output Low to the notification channel CS in response to detection of the above-described start bit ST via the data communication channel DATA. Because the adapter MICOM 302 already outputs Low to the notification channel CS at the time when the lens MICOM 111 and the camera MICOM 205 output Low to the notification channel CS, the signal level of the notification channel CS is continuously kept Low.

After transmitting all data, the adapter MICOM 302 outputs High to the notification channel CS. After receiving the stop bit SP transmitted via the data communication channel DATA, the lens MICOM 111 and the camera MICOM 205 execute analysis of the received data and internal processing corresponding to the received data. Then, the lens MICOM 111 and the camera MICOM 205 output High to the notification channel CS after the preparations for executing the next communication have finished.

When all the components constituting the camera system output High to the notification channel CS, the signal level of the notification channel CS becomes High. The camera MICOM 205, the lens MICOM 111, and the adapter MICOM 302 can confirm, based on return of the signal level of the notification channel CS to High, the fact that the components constituting the camera system have come into a state capable of executing the next communication.

As described above, in the broadcast communication, the data transmitting side notifies the start of the broadcast communication to the data receiving side by outputting Low to the notification channel CS and changing the signal level of the notification channel CS from High to Low. The data receiving side notifies cancelation of the communication wait request to the individual components of the camera system by changing the output to the notification channel CS from Low to High.

Although FIG. 4 illustrates an example of the communication waves in the broadcast communication in the present invention, the present invention is not limited to the illustrated example. In another example, the data transmitted or received in one broadcast communication may be data of multiple bytes instead of 1-byte data.

When changing the communication mode from the broadcast communication to the P2P communication, the camera MICOM 205 only transmits data instructing switching of the communication mode to the lens MICOM 111 and the adapter MICOM 302.

Explanation of P2P Communication

The P2P communication, i.e., the second communication mode in the present invention, will be described below with reference to FIG. 5. In the P2P communication, the camera 200 operates as the communication master and performs one-to-one individual communication with one of the components constituting the camera system, the one being selected as the communication slave.

Figure 5:
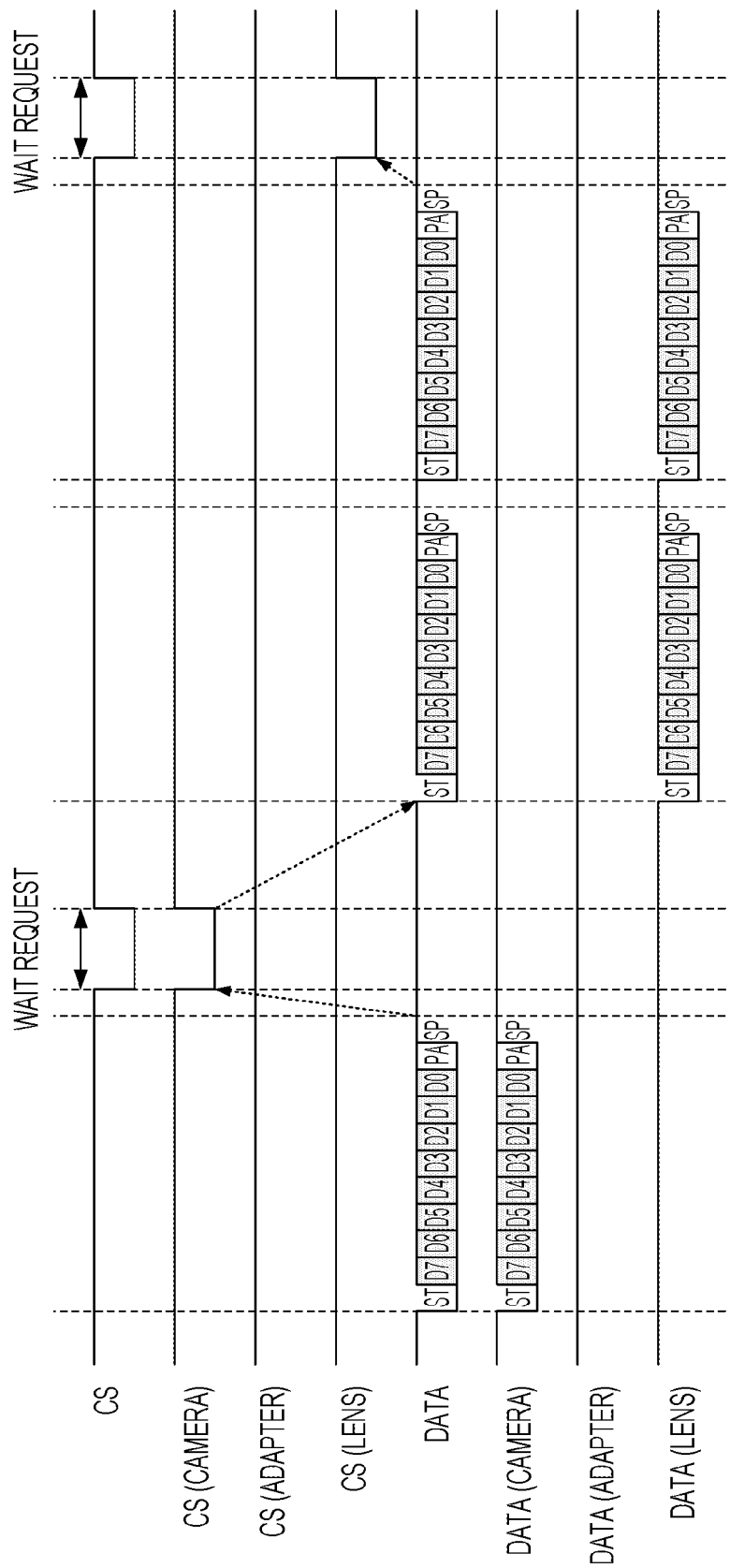
FIG. 5 is a schematic view illustrating communication waves in P2P communication.

FIG. 5 illustrates signal waves transferred in the P2P communication. FIG. 5 illustrates an example in which the interchangeable lens 100 is selected as the communication slave. Information indicating the communication slave in the P2P communication is transmitted in the broadcast communication. In the P2P communication, the data transmitting side does not output Low to the notification channel CS and transmits data to the data receiving side while keeping the notification channel CS High. Thus, the voltage level of the notification channel CS during the data transmission from the camera 200 to the interchangeable lens 100 and the intermediate adaptor 300 is made different between the broadcast communication and the P2P communication.

When the communication mode is switched from the broadcast communication to the P2P communication, the data transmission from the camera MICOM 205, i.e., the communication master, is first started.

FIG. 5 illustrates an example in which, after transmitting 1-byte data from the camera MICOM 205 to the lens MICOM 111, 2-byte data is transmitted from the lens MICOM 111 to the camera MICOM 205.

After the switching from the broadcast communication to the P2P communication has been completed in the components constituting the camera system, the camera MICOM 205, i.e., the communication master, transmits the data to the lens MICOM 111 via the data communication channel DATA. After the completion of the data transmission, the camera MICOM 205 notifies the communication wait request by outputting Low as the signal level of the notification channel CS. Then, the camera MICOM 205 returns the signal level of the notification channel CS to High after the preparations for receiving data as the data receiving side have finished.

On the other hand, the lens MICOM 111 recognizes the completion of the data transmission from the camera MICOM 205 in accordance with the change of the signal level of the notification channel CS to Low, and executes analysis of the received data and internal processing corresponding to the received data. In the example of FIG. 5, a data transmission request from the lens MICOM 111 to the camera MICOM 205 is included in the data received from the camera MICOM 205, and the lens MICOM 111 produces the data to be transmitted to the camera MICOM 205.

Thereafter, the lens MICOM 111 recognizes cancelation of the communication wait request in accordance with the return of the signal level of the notification channel CS to High, and transmits the 2-byte data to the camera MICOM 205.

After the end of the data transmission, the lens MICOM 111 outputs Low as the signal level of the notification channel CS and notifies the communication wait request. Then, the lens MICOM 111 returns the signal level of the notification channel CS to High after the preparations for receiving data as the data receiving side have finished. The adapter MICOM 302, which is not selected as the communication partner in the P2P communication, neither changes the output to the notification channel CS, nor takes part in the transmission and the reception of data.

In accordance with the timing of the data transmission from the camera MICOM 205 after the return of the signal level of the notification channel CS to High, the lens MICOM 111 determines whether the P2P communication continued or the switching to the broadcast communication has been made. When the lens MICOM 111 receives data from the camera MICOM 205 in a state in which the signal level of the notification channel CS remains High, it determines that the P2P communication is continued. On the other hand, when the lens MICOM 111 receives data from the camera MICOM 205 after the signal level of the notification channel CS has changed to Low, it determines that the communication mode has been switched from the P2P communication to the broadcast communication.

As described above, in the P2P communication, the data transmitting side notifies, to the data receiving side, the end of the data transmission from the data transmitting side by changing the signal level of the notification channel CS from High to Low. In the P2P communication, therefore, a plurality of data frames can be continuously transmitted until the data transmitting side changes the signal level of the notification channel CS. Because of not such a system configuration that communication from the communication master is inserted each time the communication slave transmits one data frame, the communication between the camera MICOM 205 and each accessory device, such as the lens MICOM 111 or the adapter MICOM 302, can be performed at a high speed. The data transmitting side notifies the communication wait request by holding the signal level of the notification channel CS at Low until the preparations for receiving data as the data receiving side have finished.

Explanation of Switching of Communication Mode

Outline of communication executed while switching the broadcast communication and the P2P communication will be described below with reference to FIG. 6. In any of the broadcast communication and the P2P communication, the camera 200 operates as the communication master and executes communication with the intermediate adapter 300 and the interchangeable lens 100. The information indicating the communication partner with the camera main unit 200 in the P2P communication is notified in the broadcast communication.

Figure 6:
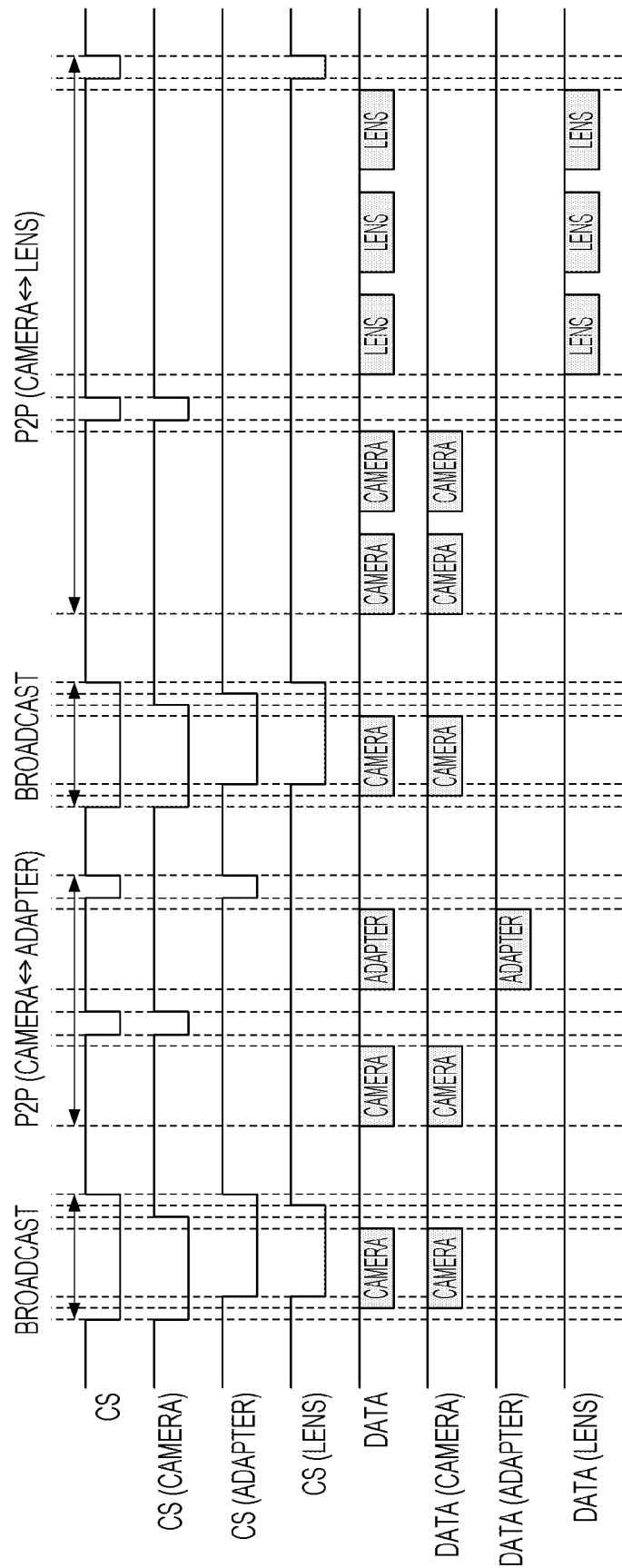
FIG. 6 is a schematic view illustrating communication waves when a communication mode is switched.

FIG. 6 illustrates communication waves in communication that is executed while switching the broadcast communication and the P2P communication. First, the information indicating that the adapter MICOM 302 has been selected as the communication partner in the P2P communication is transmitted and received in the broadcast communication. Then, the P2P communication is performed between the camera MICOM 205 and the adapter MICOM 302. In the following, the information indicating the communication partner in the P2P communication is called communication-partner designation data.

An example in which the communication-partner designation data is given with the function as a command for switching from the broadcast communication to the P2P communication will be described below. Instead of using the communication-partner designation data, switching to the P2P communication may be performed by transmitting and receiving a signal instructing the switching from the broadcast communication to the P2P communication.

After receiving the communication-partner designation data, the lens MICOM 111, which is not selected as the communication partner in the P2P communication, outputs High to the notification channel CS at the time when the analysis and the internal processing for the data received from the camera MICOM 205 have finished. Then, during a period in which the P2P communication is performed between the camera MICOM 205 and the adapter MICOM 302, the lens MICOM 111 does not change the output to the notification channel CS and maintains the setting corresponding to the broadcast communication.

In more detail, upon the completion of the switching to the P2P communication, the adapter MICOM 302 notifies the completion of the switching to the P2P communication by outputting High to the notification channel CS. The camera MICOM 205 also outputs High to the notification channel CS upon the completion of the switching to the P2P communication. As described above, the lens MICOM 111, which is not selected as the communication partner in the P2P communication, outputs High to the notification channel CS at the time when the analysis and the internal processing for the data received from the camera MICOM 205 have finished.

Upon detecting the change of the signal level of the notification channel CS to High, the camera MICOM 205 starts the P2P communication illustrated in FIG. 5. The outline of the communication executed in the P2P communication mode is as per described above with reference to FIG. 5, and hence detailed description of the P2P communication is omitted here.

When the P2P communication between the camera MICOM 205 and the adapter MICOM 302 is completed, the camera MICOM 205 transmits, in the broadcast communication, the communication-partner designation data indicating that the lens MICOM 111 has been selected as the communication partner in the P2P communication. Thereafter, the P2P communication is performed between the camera MICOM 205 and the lens MICOM 111.

Judging from the event that the signal level of the notification channel CS has changed to Low before data is transmitted from the camera MICOM 205, the adapter MICOM 302 recognizes the fact that the switching from the P2P communication to the broadcast communication has been made.

Explanation of Communication Flow in Broadcast Communication

Figure 7:
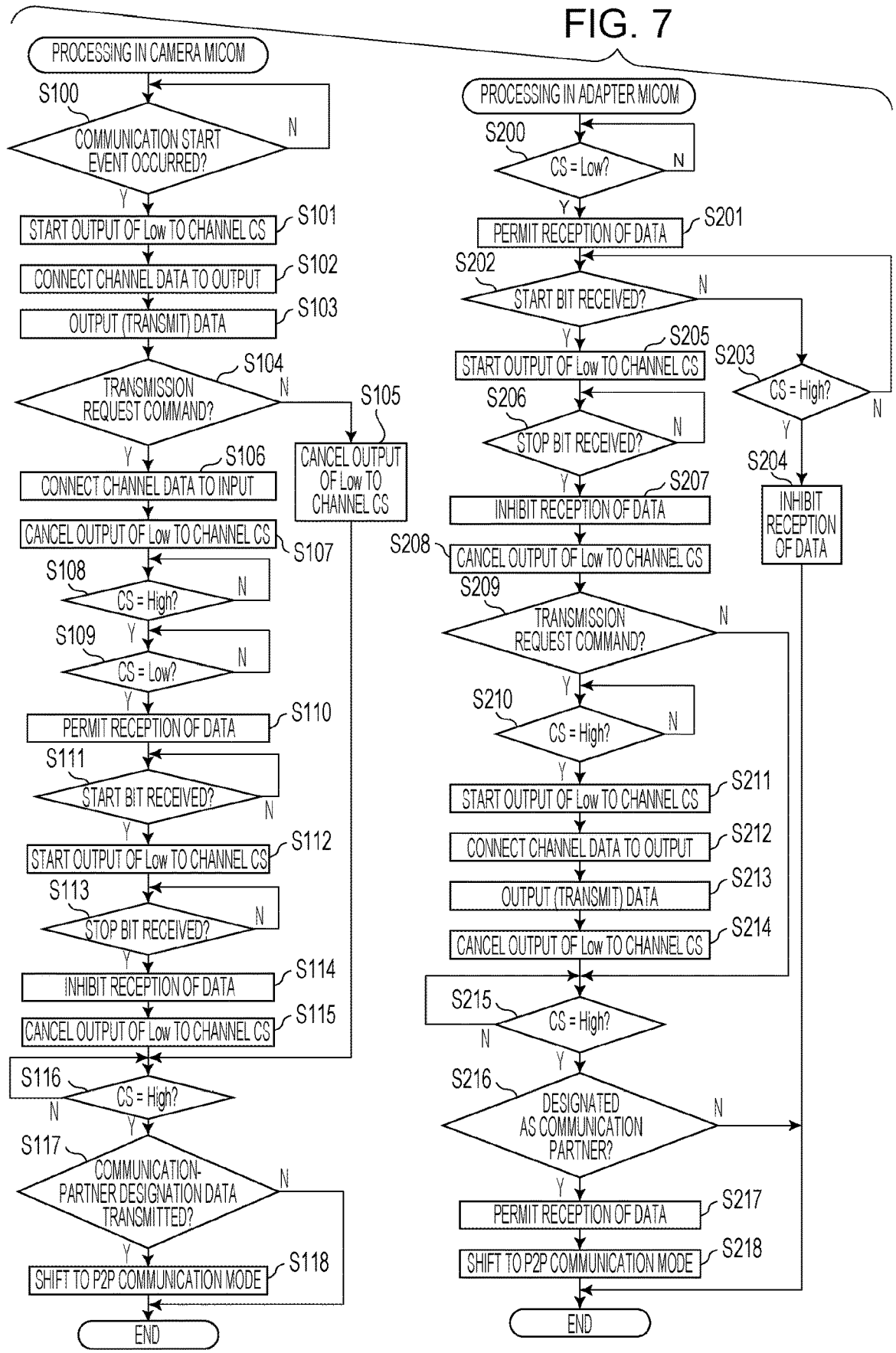
FIG. 7 is a flowchart referenced to explain a communication flow in the broadcast communication.

A communication flow in the broadcast communication will be described below with reference to FIG. 7. The camera MICOM 205 and the adapter MICOM 302 execute communication control, illustrated in a flowchart of FIG. 7, in accordance with a communication control program that is a computer program. In FIG. 7, "S" stands for a step. FIG. 7 discloses a communication flow in the camera MICOM 205 that is the communication master, and a communication flow in the adapter MICOM 302 that is the communication slave. A communication flow in the lens MICOM 111 is substantially the same as that of the adapter MICOM 302, and hence the communication flow in the lens MICOM 111 is not disclosed here.

The camera MICOM 205 determines in S100 whether an event for starting the broadcast communication has occurred. If the event for starting the broadcast communication has occurred, the camera MICOM 205 goes to S101. If that event does not occur, the determination in S100 is repeated.

In S101, the start of the broadcast communication to the lens MICOM 111 and the adapter MICOM 302 is notified by outputting Low to the notification channel CS and setting the signal level of the notification channel CS to Low. Then, in S102, the input/output changeover switch 2082 is operated to connect the data communication channel DATA to the data output unit of the camera MICOM 205. The data transmission is started in S103.

In S104, whether the transmission request command is included in the data transmitted from the camera MICOM 205 in S103 is determined. The transmission request command a command of requesting the communication slave, which has received the data transmitted from the camera MICOM 205, i.e., the communication master, to transmit data to the camera MICOM 205.

If, in S103, the transmission request command is not included in the data transmitted from the camera MICOM 205, the processing goes to S105. In S105, the output of Low to the notification channel CS is canceled after the completion of the data transmission from the camera MICOM 205. Then, the processing goes to S116.

If, in S103, the transmission request command is included in the data transmitted from the camera MICOM 205, the processing goes to S106. In S106, the data communication channel DATA is connected to the data input unit of the camera MICOM 205 after the completion of the data transmission from the camera MICOM 205. Then, the processing goes to S107. In S107, the output of Low to the notification channel CS is canceled and High is output.

In S108, whether the signal level of the notification channel CS has become High is determined. This determination is continuously performed until the signal level of the notification channel CS becomes High. When the signal level of the notification channel CS is High, this indicates that the camera system is in the state capable of performing communication. If the signal level of the notification channel CS has become High, it is determined in S109 whether the signal level of the notification channel CS changes to Low. This determination is continuously performed until the signal level of the notification channel CS changes to Low.

In response to the change of the signal level of the notification channel CS to Low, communication from the adapter MICOM 302, i.e., the communication slave, to the camera MICOM 205 is started. After determining the change of the signal level of the notification channel CS to Low, the camera MICOM 205 permits in S110 the reception of data via the data communication channel DATA. Then, the camera MICOM 205 determines in S111 whether the start bit included in the data transmitted from the adapter MICOM 302 has been received. This determination is continuously performed until the start bit is received.

Upon receiving the start bit, the processing goes to S112 in which Low is output to the notification channel CS. It is then determined in S113 whether the stop bit has been received. This determination is continuously performed until the stop bit is received. Upon receiving the stop bit, the reception of data via the data communication channel DATA is inhibited, and analysis of the received data and internal processing corresponding to the received data are executed in S114. Then, in S115, the output of Low to the notification channel CS is canceled and High is output.

Then, in S116, whether the signal level of the notification channel CS has become High is determined. This determination is continuously performed until the signal level of the notification channel CS becomes High. If the signal level of the notification channel CS has become High, it is determined in S117 whether the data transmitted in S103 is the communication-partner designation data. If the transmitted data is the communication-partner designation data, the processing goes to S118 for shift to the P2P communication. If the transmitted data is not the communication-partner designation data, the broadcast communication is continued.

The communication flow in the adapter MICOM 302 will be described below. In S200, whether the signal level of the notification channel CS has changed to Low is determined. This determination is continuously performed until the signal level of the notification channel CS changes to Low. Because the data transmission from the camera MICOM 205, i.e., the communication master, is started in response to the change of the signal level of the notification channel CS to Low, the adapter MICOM 302 permits the reception of data via the data communication channel DATA in S201.

Then, whether the start bit has been received is determined in S202. If the start bit is not received, the processing goes to S203 in which whether the signal level of the notification channel CS is High is determined.

The reason why the processing of S203 and S204 is executed here is to make the camera system adaptable for a situation in which the P2P communication is performed between the camera MICOM 205 and the lens MICOM 111 and only the adapter MICOM 302 performs the broadcast communication. Because the adapter MICOM 302 does not receive data from the camera MICOM 205 in this situation, it inhibits the reception of data via the data communication channel DATA.

As described in the above section <P2P Communication>, the signal level of the notification channel CS also changes between High and Low in the P2P communication. The signal level of the notification channel CS is High in a normal state. In the broadcast communication, the signal level of the notification channel CS is set to Low when the communication wait request is notified, or when the start of communication is notified. In the P2P communication, the signal level of the notification channel CS is set to Low when the communication wait request is notified.

A situation in which the adapter MICOM 302 does not receive the start bit from the camera MICOM 205 is supposed to be any of the following two situations.

The first situation is a situation in which the data transmission is not started after the camera MICOM 205 has set the signal level of the notification channel CS to Low. The second situation is a situation in which the camera MICOM 205 and the lens MICOM ill are performing the P2P communication and the adapter MICOM 302 does not take part in the P2P communication.

In the first situation, because the signal level of the notification channel CS does not become High, the processing returns from S203 to S202 and repeats the determinations in S202 and S203 until the data transmission from the camera MICOM 205 is started.

In the second situation, because the signal level of the notification channel CS remains High unless either one of the camera MICOM 205 and the lens MICOM 111 notifies the communication wait request. In this situation, the processing basically goes to S204 from S203, and the reception of data via the data communication channel DATA is inhibited. When the communication wait request is notified in the P2P communication, the processing returns from S203 to S202 in which the determination in S203 is executed again. Although the determination in S203 is executed multiple times, the processing goes to S204 from S203 when the communication wait request is canceled and the signal level of the notification channel CS becomes High.

By adding the control flow of S203 and S204 as described above, the broadcast communication and the P2P communication can be performed in a combined manner in the camera system. Thus, in this embodiment, the P2P communication can be performed between the camera MICOM 205 and the lens MICOM 111 while the adapter MICOM 302 can be held in a standby state adaptable for the broadcast communication.

Returning to the explanation of S202, upon receiving the start bit in S202, the adapter MICOM 302 starts analysis of the received data and internal processing corresponding to the received data, and outputs Low to the notification channel CS. The communication wait request is thereby notified to the components constituting the camera system.

Then, whether the stop bit has been received is determined in S206. This determination is continuously performed until the stop bit is received. Upon receiving the stop bit, the reception of data via the data communication channel DATA is inhibited and the analysis of the received data and the internal processing corresponding to the received data are continued in S207. When the internal processing of the data is completed and a state capable of executing the next data communication is established, the output of Low to the notification channel CS is canceled and High is output in S208.

In S209, whether the transmission request command is included in the data received from the camera MICOM 205 is determined. If the transmission request command is included, the processing goes to S210 in which whether the signal level of the notification channel CS has become High is determined. This determination is continuously performed until the signal level of the notification channel CS becomes High. When the signal level of the notification channel CS is High, this indicates that the camera system is in the state capable of performing communication. If the transmission request command is not included in the data received from the camera MICOM 205, the processing goes to later-described S215.

If it is determined in S210 that the signal level of the notification channel CS is High, the processing goes to S211. In S211, Low is output to the notification channel CS to change the signal level of the notification channel CS to Low, thereby notifying the start of the broadcast communication to the camera MICOM 205 and the lens MICOM 111. Then, in S212, the input/output changeover switch 3032 is operated to connect the data communication channel DATA to the data output unit of the adapter MICOM 302. The data transmission is started in S213.

Upon the completion of the data transmission, the output of Low to the notification channel CS is canceled and High is output in S214. Then, in S215, whether the signal level of the notification channel CS has become High is determined. This determination is continuously performed until the signal level of the notification channel CS becomes High.

If the signal level of the notification channel CS has become High, the processing goes to S216. In S216, the adapter MICOM 302 determines whether the data received from the camera MICOM 205 is the communication-partner designation data, and whether the adapter MICOM 302 is selected as the communication partner with the camera MICOM 205 in the P2P communication. If the adapter MICOM 302 is selected as the communication partner with the camera MICOM 205 in the P2P communication, the processing goes to S217 in which the reception of data via the data communication channel DATA is permitted. Then, in S218, the communication mode is shifted from the broadcast communication to the P2P communication.

If the data received from the camera MICOM 205 is not the communication-partner designation data or if the adapter MICOM 302 is not selected as the communication partner in the P2P communication, the broadcast communication is continued without shifting to the P2P communication.

Communication Flow in P2P Communication

Figure 8:
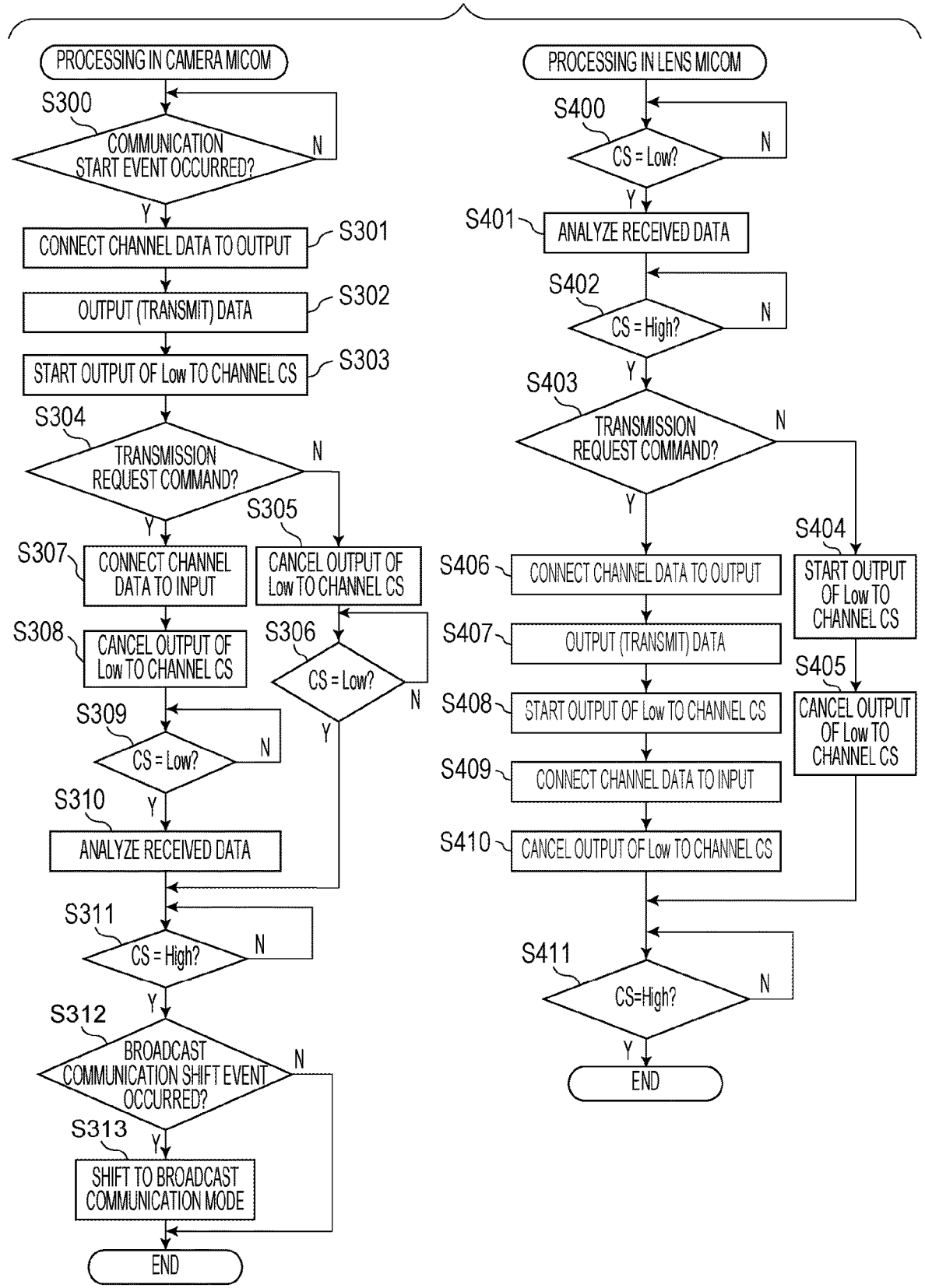
FIG. 8 is a flowchart referenced to explain a communication flow in the P2P communication.

A communication flow in the P2P communication will be described below with reference to FIG. 8. The camera MICOM 205 and the lens MICOM 111 execute communication control, illustrated in a flowchart of FIG. 8, in accordance with a communication control program that is a computer program. In FIG. 8, "S" stands for a step. FIG. 8 discloses a communication flow in the camera MICOM 205 that is the communication master, and a communication flow in the lens MICOM 111 that is the communication slave. A communication flow in the adapter MICOM 302 is substantially the same as that of the lens MICOM 111, and hence description of the communication flow in the adapter MICOM 302 is not disclosed here.

The camera MICOM 205 determines in S300 whether an event for starting the P2P communication has occurred. If it is determined that the event for starting the P2P communication has occurred, the processing goes to S301. If that event does not occur, the determination in S300 is repeated.

In S301, the input/output changeover switch 2082 is operated to connect the data communication channel DATA to the data output unit of the camera MICOM 205. Then, the data transmission is started in S302.

In S303, Low is output to the notification channel CS, thereby changing the signal level of the notification channel CS to Low. Thus, the camera MICOM 205 issues the communication wait request to the lens MICOM 111 that is the communication slave. During a period in which the signal level of the notification channel CS is Low, the lens MICOM does not perform the data transmission to the camera MICOM 205.

In S304, whether the transmission request command is included in the data transmitted from the camera MICOM 205 in S302 is determined. The transmission request command is a command of requesting the communication slave to transmit data to the camera MICOM 205. If, in S302, the transmission request command is not included in the data transmitted from the camera MICOM 205, no data is transmitted from the lens MICOM 111. In this case, the processing goes to S305 from S304, and whether the lens MICOM 111 notifies the communication wait request is checked.

More specifically, the output of Low to the notification channel CS from the camera MICOM 205 is canceled in S305, and whether the signal level of the notification channel CS is Low is determined in S306. As a result, it is possible to determine whether the lens MICOM 111 sets the signal level of the notification channel CS to Low, i.e., whether the lens MICOM 111 notifies the communication wait request.

In general, the lens MICOM 111 having received data from the camera MICOM 205 notifies the communication wait request by outputting Low to the notification channel CS for a certain period in order to execute analysis and internal processing of the received data. S306 is executed to recognize the communication wait request from the lens MICOM 111. After S305, the signal level of the notification channel CS temporarily becomes High in some cases. In such a case, the camera MICOM 205 waits for change of the signal level of the notification channel CS to Low by making the determination in S306. After confirming in S306 that the signal level of the notification channel CS has changed to Low, the processing goes to S311.

Let now return to S304. If it is determined in S304 that the data transmitted from the camera MICOM 205 in S302 is the transmission request command, the processing goes to S307.

In S307, the input/output changeover switch 2082 is operated to connect the data communication channel DATA to the data input unit of the camera MICOM 205. Furthermore, in S308, the output of Low to the notification channel CS is canceled and High is output.

Data from the lens MICOM 111 is received in a state in which the signal level of the notification channel CS is High. Then, in S309, whether the signal level of the notification channel CS has changed to Low is determined. In response to the change of the signal level of the notification channel CS to Low, the completion of the data transmission from the lens MICOM 111 is determined, and data analysis is executed in S310.

Then, in S311, whether the signal level of the notification channel CS has become High is determined. This determination is continuously performed until the signal level of the notification channel CS becomes High. The state in which the signal level of the notification channel CS is High indicates that the lens MICOM 111, i.e., the communication slave, is in the state capable of performing data communication.

If the signal level of the notification channel CS has become High, the processing goes to S312 in which whether an event for shifting to the broadcast communication has occurred is determined. If the event for shifting to the broadcast communication has occurred, the processing goes to S313 in which the communication mode is shifted to the broadcast communication. If the event for shifting to the broadcast communication does not occur, the P2P communication is continuously performed.

The communication flow in the lens MICOM 111, i.e., the communication slave, will be described below. After executing the switching from the broadcast communication to the P2P communication, the lens MICOM 111 first receives data transmitted from the camera MICOM 205. During a period in which the lens MICOM 111 receives the data transmitted from the camera MICOM 205, the signal level of the notification channel CS is kept High.

Then, in S400, whether the signal level of the notification channel CS has changed to Low is determined. In response to the change of the signal level of the notification channel CS to Low, the completion of the data transmission from the camera MICOM 205 is determined, and data analysis is executed in S401.

Then, in S402, whether the signal level of the notification channel CS has become High is determined. This determination is continuously performed until the signal level of the notification channel CS becomes High. The state in which the signal level of the notification channel CS is Low indicates that the camera MICOM 205 is in the state notifying the communication wait request.

If the signal level of the notification channel CS has become High, whether the transmission request command is included in the data received from the camera MICOM 205 is determined in S403. If the transmission request command is not included in the data received from the camera MICOM 205, the processing goes to S404.

In S404, by changing the signal level of the notification channel CS to Low, the communication wait request is notified to the camera MICOM 205 in order to execute internal processing for the data received from the camera MICOM 205, etc. When the lens MICOM comes into the state capable of performing communication, it sets the signal level of the notification channel CS to High and cancels the communication wait request in S405. Thereafter, the processing goes to S411.

Let now return to S403. If it is determined in S403 that the transmission request command is included in the data received from the camera MICOM 205, the processing goes to S406. In S406, the input/output changeover switch 1122 is operated to connect the data communication channel DATA to the data output unit of the lens MICOM 111. Then, in S407, the data transmission to the camera MICOM 205 is started.

After the data transmission to the camera MICOM 205 has been completed, Low is output to the notification channel CS and the signal level of the notification channel CS is changed to Low in S408. Thus, the lens MICOM 111 issues the communication wait request to the camera MICOM 205 that is the communication master. During a period in which the signal level of the notification channel CS is Low, the camera MICOM 205 does not perform the data transmission to the lens MICOM 111.

In S409, the input/output changeover switch 1122 is operated to connect the data communication channel DATA to the data input unit of the lens MICOM 205. Then, in S410, the output of Low to the notification channel CS is canceled and High is output.

In S411, whether the signal level of the notification channel CS has become High is determined. This determination is continuously performed until the signal level of the notification channel CS becomes High. The state in which the signal level of the notification channel CS is High indicates that the camera MICOM 205 and the lens MICOM 111 are in the state capable of performing communication.

As described above, the voltage level of the notification channel CS during the data transmission from the camera 200 to the interchangeable lens 100 and the intermediate adaptor 300 is made different between the broadcast communication and the P2P communication. With such a system, when the camera 200 individually communicates with the particular accessory device, there is no necessity of notifying the communication partner again until the communication partner is changed. Hence the communication between the camera 200 and each of the accessory devices including the interchangeable lens 100 and the adaptor 300 can be performed at a high speed.

Modification

A communication control method, different from that illustrated in FIG. 4, in the broadcast communication will be described below. In the broadcast communication illustrated in FIG. 4, the camera MICOM 205 notifies the start of the broadcast communication to each communication slave by outputting Low to the notification channel CS and changing the signal level of the notification channel CS to Low.

Figure 9:
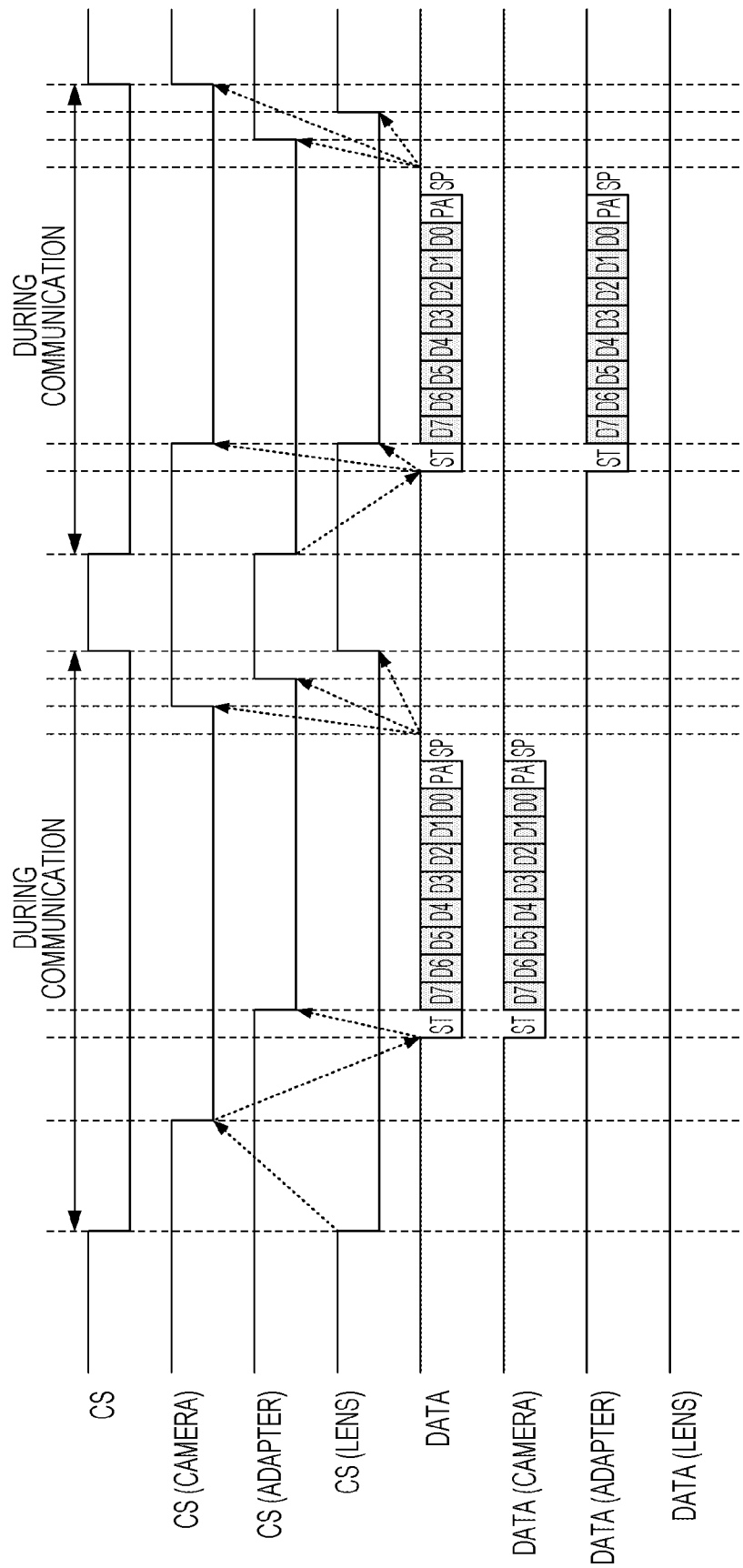
FIG. 9 is a schematic view illustrating communication waves in the broadcast communication.

A modification illustrated in FIG. 9 represents an example in which the lens MICOM 111 or the adapter MICOM 302, i.e., the communication slave, requests the start of the broadcast communication to the camera MICOM 205. The communication request to the camera MICOM 205 is executed when the microcomputer included in the accessory device takes the initiative in restarting the communication with the camera MICOM 205 in a state in which the communication from the camera MICOM 205 to the microcomputer included in the accessory device is temporarily stopped.

Processing in this modification is executed, for example, when an operating member 304 disposed in the intermediate adapter 300 is operated by a user. The processing may also be executed when an operating member 130 disposed in the interchangeable lens 100 is operated by the user. When communication is restarted in the camera system from the state in which the communication is temporarily stopped, it is basically appropriate that the camera MICOM 205, i.e., the communication master, takes the initiative in restarting the communication. Giving the microcomputer included in the accessory device, i.e., the communication slave, with the function of restarting the communication may accompany a possibility that the communication is restarted at the timing not expected by the camera MICOM 205, i.e., the communication master. Accordingly, giving the communication slave with the function of restarting the communication in an unlimited fashion not desired.

Taking into account the above point, in this modification, the microcomputer included in the accessory device, i.e., the communication slave, is given with the function of restarting the communication by issuing a communication start request to the camera MICOM 205 from the microcomputer included in the accessory device.

FIG. 9 illustrates a communication waveform in the broadcast communication performed in this modification. According to the communication control method in this modification, the lens MICOM 111 or the adapter MICOM 302, i.e., the communication slave, monitors the occurrence of a communication start event. If the communication start event has occurred, Low is output to the notification channel CS, thereby changing the signal level of the notification channel CS to Low.

In response to the change of the signal level of the notification channel CS to Low, the camera MICOM 205 outputs Low to the notification channel CS and starts the broadcast communication. A flow of the broadcast communication after the output of Low to the notification channel CS is the same as the flow described with reference to FIG. 4, and hence description of that flow is omitted here.

The above-described embodiment can be implemented by additionally using other communication channels in combination with the notification channel CS and the data communication channel DATA.

Figure 10:
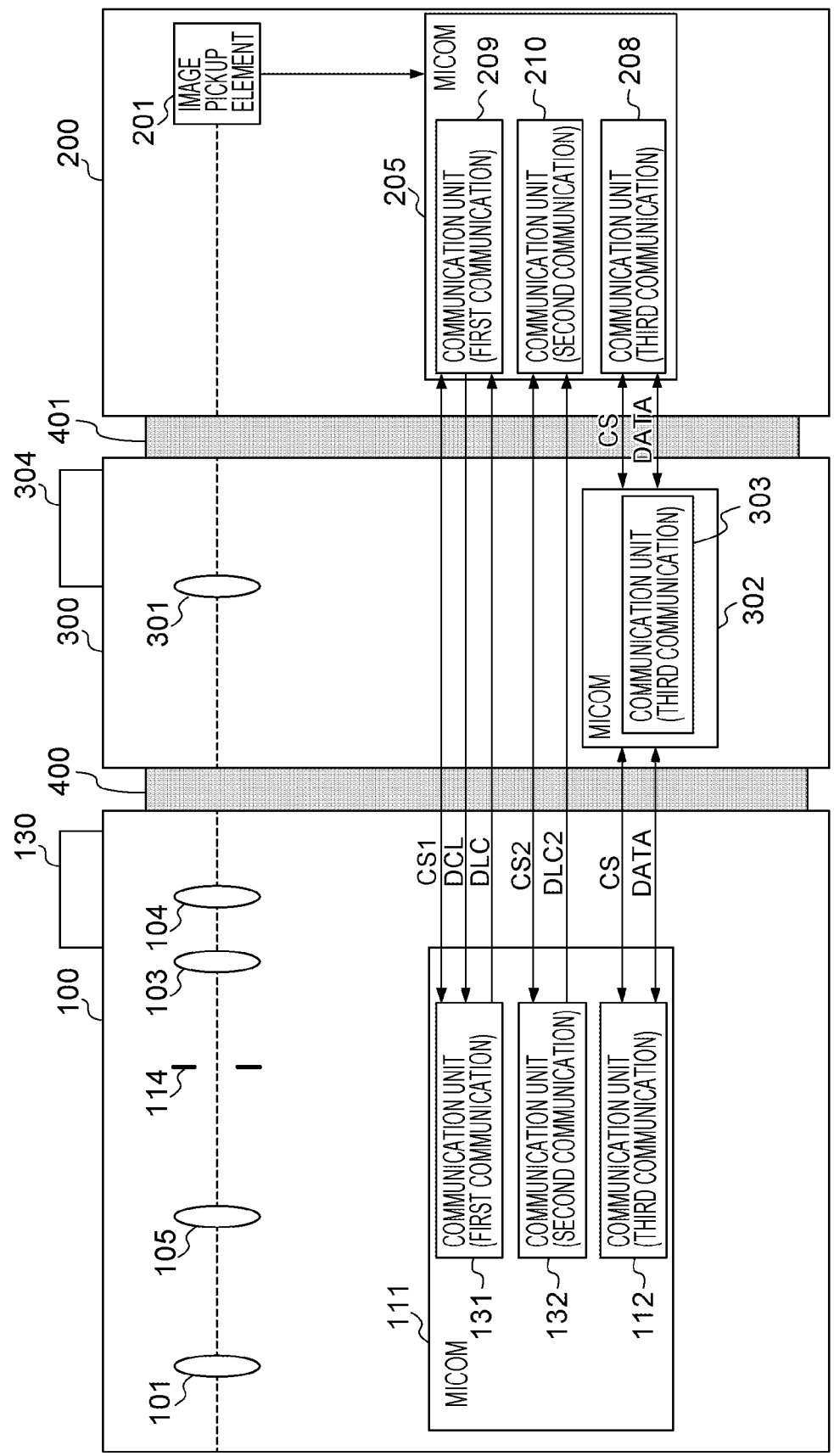
FIG. 10 is an explanatory view referenced to explain other communication channels.

An example of such a case will be described below with reference to FIG. 10. In FIG. 10, the same components as those in FIG. 1 are denoted by the same reference numerals, and duplicate description of the same components is omitted. Furthermore, in FIG. 10, some of the components illustrated in FIG. 1 are not illustrated. The notification channel CS and the data communication channel DATA in the above description correspond to a communication line for communication called here third communication.

The lens MICOM 111 controls, in addition to the communication unit 112, a communication unit 131 for first communication and a communication unit 132 for second communication. The camera MICOM 205 controls, in addition to the communication unit 112, a communication unit 209 for the first communication and a communication unit 210 for the second communication.

The first communication is first described. The first communication is performed with the aid of the communication unit 131 and the communication unit 209. Via a notification channel CS1, a data communication channel DCL, and a data communication channel DLC, the communication unit 131 performs the communication in accordance with an instruction from the lens MICOM 111, and the communication unit 209 performs the communication in accordance with an instruction from the camera MICOM 205. The communication unit 131 and the communication unit 209 set a voltage level of the notification channel CS1, a communication rate (data amount per unit time) in start-stop synchronization communication, and a communication voltage. Furthermore, the communication unit 131 and the communication unit 209 transmit and receive data via the data communication channel DCL and the data communication channel DLC upon receiving instructions from the lens MICOM 111 and the camera MICOM 205.

The notification channel CS1 is a signal line used, for example, to notify a communication request from the camera main unit 200 to the interchangeable lens 100. The data communication channel DCL is a channel used when data is transmitted from the camera 200 to the interchangeable lens 100, and the data communication channel DLC is a channel used when data is transmitted from the interchangeable lens 100 to the camera main unit 200.

In the first communication, the camera MICOM 205 and the lens MICOM 111 perform the communication according to clock synchronization communication or start-stop synchronization communication. Initial communication performed after the interchangeable lens 100 has been connected to the camera 200 is also performed according to the first communication at the beginning. The camera MICOM 205 and the lens MICOM 111 communicate identification information of the interchangeable lens 100 and switch the communication mode from the clock synchronization communication to the start-stop synchronization communication if it is determined that the interchangeable lens 100 mounted to the camera 200 is adaptable for the start-stop synchronization communication. From the result of the communication of the identification information, the camera MICOM 205 may determine whether the interchangeable lens 100 is adaptable for the third communication in which communication is performed with inclusion of the adapter 300 as well. If the camera MICOM 205 determines that the interchangeable lens 100 is adaptable for the third communication, it may perform authentication communication, which is to recognize the interchangeable lens 100 and the intermediate adapter 300, via the P2P communication.

Next, the second communication is described. The second communication is one-way communication from the interchangeable lens 100 to the camera 200. The second communication is performed with the aid of the communication unit 132 and the communication unit 210. Via a notification channel CS2 and a data communication channel DLC2, the communication unit 132 performs communication in accordance with an instruction from the lens MICOM 111, and the communication unit 210 performs communication in accordance with an instruction from the camera MICOM 205. The camera communication unit 208 and the lens communication unit 118 transmit and receive data according to the clock synchronization communication or the start-stop synchronization communication. By using not only the data communication channel DLC for the first communication, but also the data communication channel DLC2 for the second communication channel, a large amount of data can be transmitted from the interchangeable lens 100 to the camera 200 in a short time.

The above-described embodiment is merely a typical example, and various modifications or alterations can be made on the embodiment when the present invention is practically implemented. For instance, while the above-described embodiment represents an example in which the interchangeable lens and the intermediate adapter are used as the accessory devices, an interchangeable lens directly mounted to the camera, a strobe directly mounted to the camera main unit, etc. may also be used as the accessory devices.

According to the present invention, the accessory device and the camera are obtained which can perform communication between the camera and the accessory device at a high speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An accessory device mountable to a camera,
the accessory device comprising an accessory control unit controlling communication that is performed between the camera and the accessory device via channels, the channels including a data communication channel used for data communication and a notification channel for notifying timing of communication performed via the data communication channel,
wherein the accessory control unit
is able to switch a first communication mode used for communication between the camera and a plurality of accessory devices, which are mounted to the camera and include the aforesaid accessory device, and a second communication mode that is used to individually communicate with the camera and that is different from the first communication mode in voltage level of the notification channel during a period in which data is received from the camera, and
performs switching from the first communication mode to the second communication mode upon receiving communication-partner designation data via the data communication channel in the first communication mode, the communication-partner designation data indicating that the aforesaid accessory device has been selected as a communication partner with the camera in the second communication mode.

2. The accessory device according to claim 1, wherein the voltage level of the notification channel during the period in which data is received from the camera in the first communication mode is a first level, and the voltage level of the notification channel during the period in which data is received from the camera in the second communication mode is a second level higher than the first level.

3. The accessory device according to claim 2, wherein the accessory control unit changes the voltage level of the notification channel after receiving the data from the camera in the first communication mode, and performs data transmission to the camera via the data communication channel.

4. The accessory device according to claim 3, wherein the accessory control unit changes the voltage level of the notification channel to the second level from the first level, and then performs the data transmission to the camera via the data communication channel in a state in which the voltage level of the notification channel is at the first level.

5. The accessory device according to claim 2, wherein, in a state in which communication from the camera via the data communication channel is stopped in the first communication mode, the accessory control unit restarts the communication from the camera by changing the voltage level of the notification channel from the second level to the first level.

6. The accessory device according to claim 2, wherein the accessory control unit starts data transmission to the camera in response to change of the voltage level of the notification channel from the first level to the second level after starting reception of data from the camera in the second communication mode.

7. The accessory device according to claim 6, wherein the accessory control unit starts reception of data from the camera in a state in which the voltage level of the notification channel is at the second level, and starts the data transmission to the camera in response to an event that, after starting the reception of data, the voltage level of the notification channel is changed from the second level to the first level and further changed to the second level again.

8. The accessory device according to claim 2, wherein the accessory control unit changes the voltage level of the notification channel from the second level to the first level after data transmission to the camera in the second communication mode.

9. The accessory device according to claim 1, wherein the accessory control unit notifies end of data transmission from the accessory device by changing the voltage level of the notification channel in the second communication mode from a voltage level at start of the data transmission to the camera to a voltage level that is different from the voltage level at the start of the data transmission to the camera.

10. The accessory device according to claim 9, wherein the accessory control unit is able to continuously transmit a plurality of data frames to the camera.

11. The accessory device according to claim 1, wherein the accessory control unit does not perform the switching from the first communication mode to the second communication mode when the communication-partner designation data received from the camera in the first communication mode is data indicating that the aforesaid accessory device has not been selected.

12. The accessory device according to claim 1, wherein a plurality of accessory devices are mountable to the camera, the plurality of accessory devices and the camera being able to set the notification channel to first setting and second setting,
the voltage level of the notification channel is different between when one of the plurality of accessory devices and the camera sets the notification channel to the first setting and when the plurality of accessory devices and the camera set the notification channel to the second setting, and
the accessory control unit
sets the notification channel to the first setting during a period in which data is received from the camera in the first communication mode, and sets the notification channel to the second setting during at least part of a period in which data is received from the camera in the second communication mode.

13. A camera to which a first accessory device and a second accessory device are mountable, the camera comprising a camera control unit controlling communication that is performed via channels including a data communication channel used for data communication with the first accessory device and the second accessory device, and a notification channel for notifying timing of communication performed via the data communication channel, wherein the camera control unit is able to switch a first communication mode used for communication with the first accessory device and the second accessory device and a second communication mode that is used to individually communicate with one of the first accessory device and the second accessory device and that is different from the first communication mode in voltage level of the notification channel during a period in which data is transmitted from the camera, and performs switching from the first communication mode to the second communication mode upon transmitting communication-partner designation data to the first accessory device and the second accessory device via the data communication channel in the first communication mode, the communication-partner designation data indicating a communication partner with the camera in the second communication mode.

14. The camera according to claim 13, wherein the camera control unit sets the voltage level of the notification channel to a first level during a period in which data is transmitted to the first accessory device and the second accessory device in the first communication mode, and sets the voltage level of the notification channel to a second level during a period in which data is transmitted to the one accessory device in the second communication mode, the second level being higher than the first level.

15. The camera according to claim 14, wherein the camera control unit changes the voltage level of the notification channel from the second level to the first level in response to completion of data transmission to the one accessory device in the second communication mode.

16. The camera according to claim 15, wherein the camera control unit is able to continuously transmit a plurality of data frames to the accessory device.

17. The camera according to claim 14, wherein each of the camera, the first accessory device, and the second accessory device is able to set the notification channel to first setting and second setting, the voltage level of the notification channel is different between when at least one of the camera, the first accessory device, and the second accessory device sets the notification channel to the first setting and when the camera, the first accessory device, and the second accessory device set the notification channel to the second setting, and the camera control unit switches setting of the notification channel from the first setting to the second setting in response to end of data transmission to the plurality of accessory devices in the first communication mode, and switches the setting of the notification channel from the second setting to the first setting in response to end of data transmission to the accessory device that is a communication partner in the second communication mode.

18. The camera according to claim 13, wherein, in a state in which communication from the camera via the data communication channel is stopped, the data communication to the accessory device mounted to the camera is restarted in response to change of the voltage level of the notification channel from the second level to the first level in the first communication mode.

19. A non-transitory computer readable storage medium storing a communication control program for a computer in an accessory device mountable to a camera and performing communication with the camera via channels including a data communication channel used for data communication and a notification channel for notifying timing of communication performed via the data communication channel, the accessory device being able to switch a first communication mode used for communication between the camera and a plurality of accessory devices, which are mounted to the camera and include the aforesaid accessory device, and a second communication mode that is used to individually communicate with the camera and that is different from the first communication mode in voltage level of the notification channel during a period in which data is received from the camera, the communication control program causing the computer to execute steps of:

receiving communication-partner designation data from the camera in the first communication mode, the communication-partner designation data indicating that the aforesaid accessory device has been selected as a communication partner with the camera in the second communication mode; and performing switching from the first communication mode to the second communication mode upon receiving the communication-partner designation data.

20. A non-transitory computer readable storage medium storing a communication control program for a computer in a camera to which a first accessory device and a second accessory device are mountable, the camera performing communication that is performed via channels including a data communication channel used for data communication with the first accessory device and the second accessory device, and a notification channel for notifying timing of communication performed via the data communication channel, the camera being able to switch a first communication mode used for communication with the first accessory device and the second accessory device and a second communication mode that is used to individually communicate with one of the first accessory device and the second accessory device and that is different from the first communication mode in voltage level of the notification channel during a period in which data is transmitted from the camera, the communication control program causing the computer to execute steps of:

transmitting communication-partner designation data to the plurality of accessory devices in the first communication mode, the communication-partner designation data indicating the accessory device that has been selected as a communication partner in the second communication mode; and performing switching from the first communication mode to the second communication mode upon transmitting the communication-partner designation data.

21. A camera system including a camera, a first accessory device, and a second accessory device, the latter two being mountable to the camera, wherein the camera comprises a camera control unit controlling communication that is performed via channels including a data communication channel used for data communication with the first accessory device and the second accessory device, and a notification channel for notifying timing of communication performed via the data communication channel, each of the first accessory device and the second accessory device comprises an accessory control unit controlling communication that is performed via the channels including the data communication channel and the notification channel, each of the camera control unit and the accessory control units in the first accessory device and the second accessory device is able to switch a first communication mode used for the camera to communicate with the plurality of accessory devices and a second communication mode that is used for the camera to individually communicate with one of the plurality of accessory devices and that is different from the first communication mode in voltage level of the notification channel during a period in which data is transmitted from the camera, the camera control unit performs switching from the first communication mode to the second communication mode upon transmitting communication-partner designation data in the first communication mode, the communication-partner designation data indicating a communication partner with the camera in the second communication, and the accessory control unit in one of the first accessory device and the second accessory device, the one being designated by the communication-partner designation data, performs switching from the first communication mode to the second communication mode upon receiving the communication-partner designation data.

\* \* \* \* \*